United States Patent
Muto et al.

(10) Patent No.: US 10,133,901 B2
(45) Date of Patent: Nov. 20, 2018

(54) SYSTEM FOR READING INFORMATION CODE

(71) Applicant: DENSO WAVE INCORPORATED, Chita-gun, Aichi-Pref. (JP)

(72) Inventors: Eiji Muto, Chita-gun (JP); Koji Hayashi, Chita-gun (JP); Atsushi Tano, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 15/375,624

(22) Filed: Dec. 12, 2016

(65) Prior Publication Data

US 2017/0169270 A1    Jun. 15, 2017

(30) Foreign Application Priority Data

Dec. 10, 2015 (JP) .................................. 2015-240860

(51) Int. Cl.
*G06K 7/14* (2006.01)
*G06F 3/14* (2006.01)
*G06K 7/10* (2006.01)

(52) U.S. Cl.
CPC .............. *G06K 7/1456* (2013.01); *G06F 3/14* (2013.01); *G06K 7/1095* (2013.01); *G09G 2358/00* (2013.01)

(58) Field of Classification Search
CPC .................................................. G06K 7/1456
USPC ........................... 235/470, 437, 494; 705/23
See application file for complete search history.

(56) References Cited

U.S. PATENT DOCUMENTS

| | | | | |
|---|---|---|---|---|
| 2009/0165962 | A1* | 7/2009 | Drummond | B65C 11/0289 156/767 |
| 2013/0256405 | A1* | 10/2013 | Montout | G06K 7/1091 235/375 |
| 2015/0186765 | A1* | 7/2015 | Osborne | G06K 19/06112 235/375 |
| 2016/0048826 | A1* | 2/2016 | Fefferman | G06Q 20/3274 705/23 |
| 2016/0364590 | A1* | 12/2016 | Wadley | G07C 9/00103 |
| 2017/0103622 | A1* | 4/2017 | Priebatsch | G07G 1/0045 |

FOREIGN PATENT DOCUMENTS

JP    2012-083913 A    4/2012

* cited by examiner

*Primary Examiner* — Allyson Trail
(74) *Attorney, Agent, or Firm* — Oliff PLC

(57) ABSTRACT

A system including a reader and an information terminal is provided. The information terminal displays an information code, while the reader optically reads the information code. The reader includes an emission unit and an imaging unit. The emission unit emits light in a predetermined emission state when the information code is imaged by the imaging unit. The information terminal includes an imaging unit, a control unit and a display unit. The control unit of the information terminal drives/controls the display unit to display the information code only when the predetermined emission state is imaged by the imaging unit. That is, unless the predetermined emission state of the emission unit of the reader is imaged by the imaging unit of the information terminal, the information code is not displayed on the display unit of the information terminal. Thus, security in reading the information code is further improved.

17 Claims, 9 Drawing Sheets

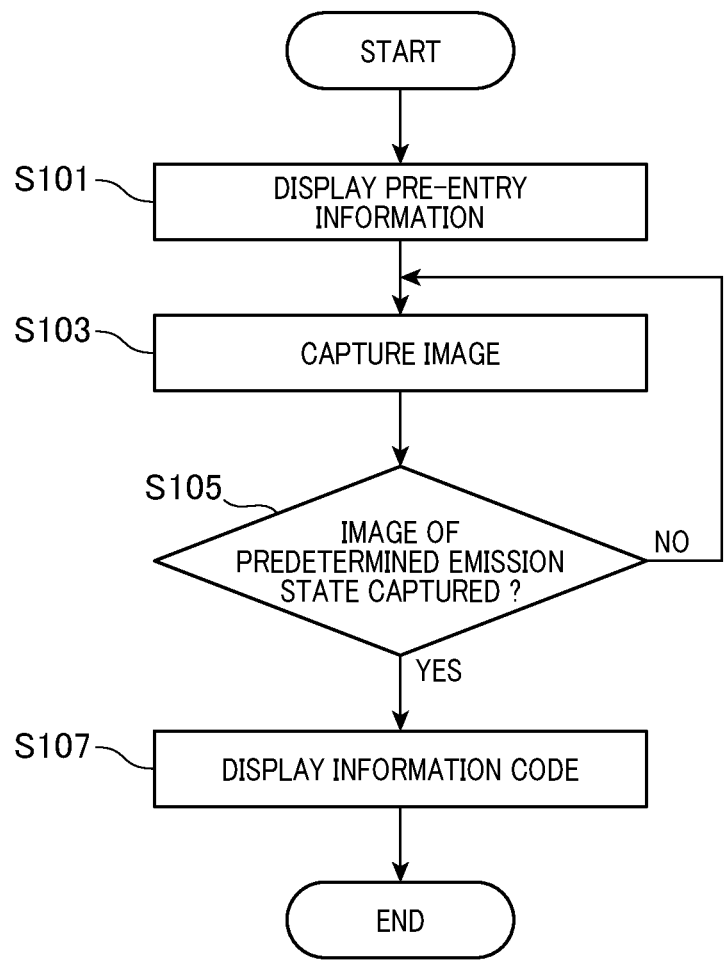

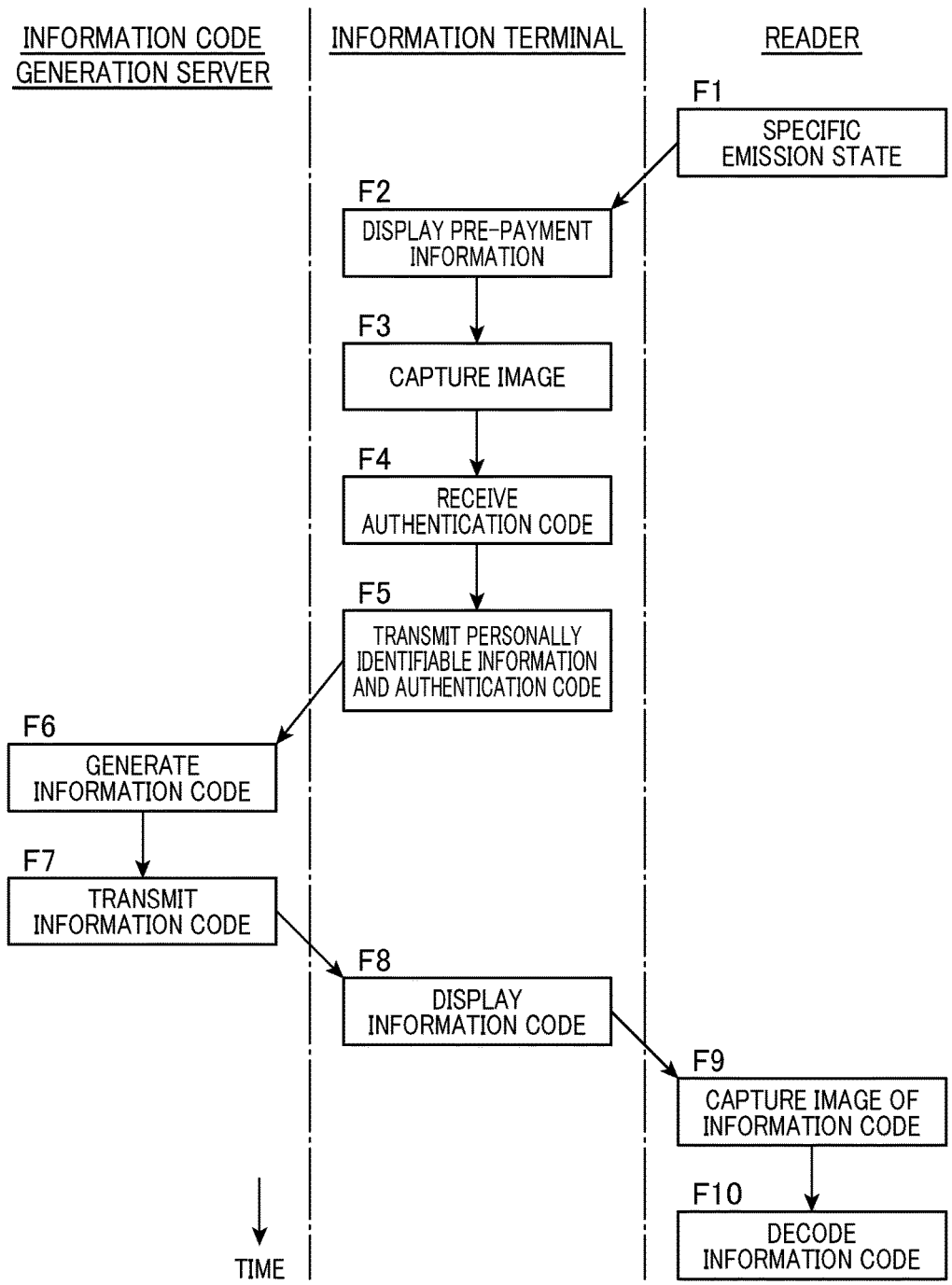

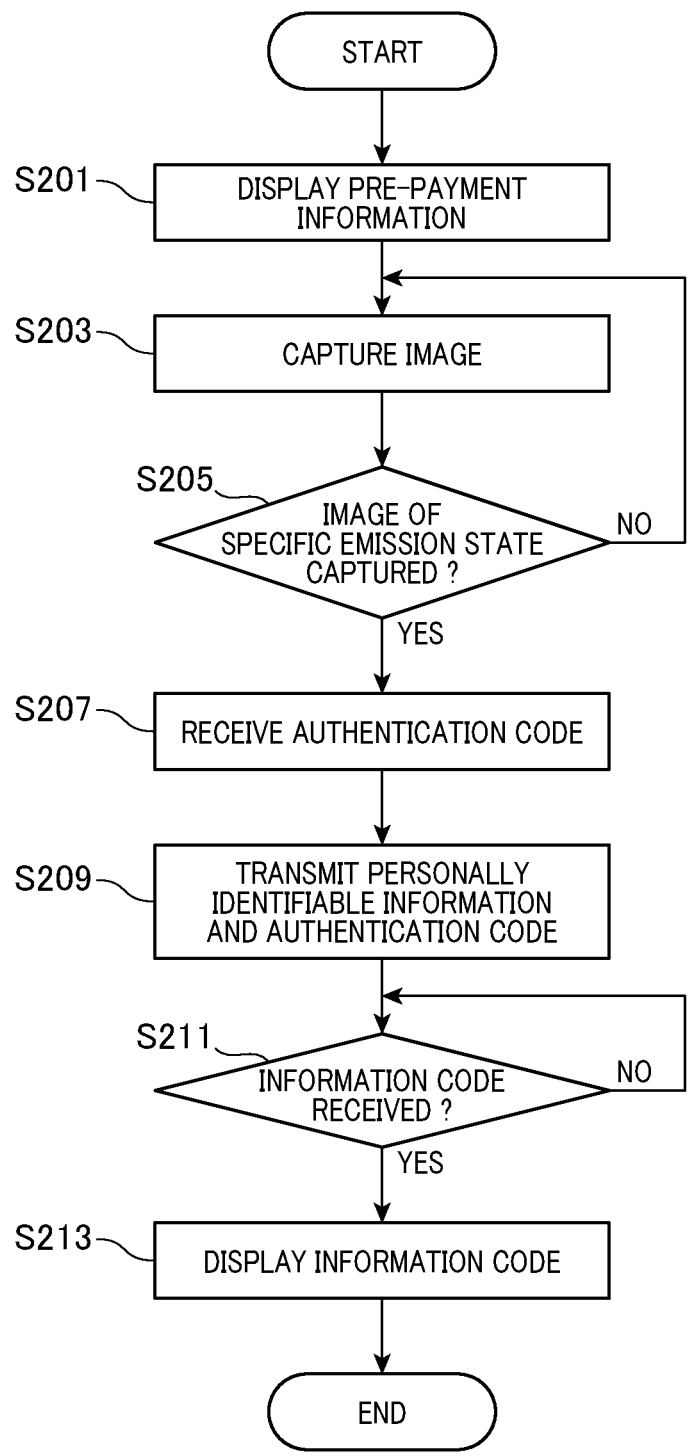

SYSTEM FOR READING INFORMATION CODE

CROSS-REFERENCE TO RELATED APPLICATION

This application is based on and claims the benefit of priority from earlier Japanese Patent Application No. 2015-240860 filed Dec. 10, 2015, the description of which is incorporated herein by reference.

BACKGROUND

Technical Field

The present disclosure relates to a system for reading an information code, and particularly relates to a system including an information terminal for displaying an information code, such as a two-dimensional code, and a reader for optically reading the information code.

Related Art

In conventionally known techniques, an information code is optically read by a reader, with the information code being displayed on an information terminal, such as a mobile phone, to cause the reader to perform a process according to the information code.

An example of such a technique includes a scheme implemented by the system disclosed in a patent document 1. This scheme relates to a method of credit card payment using a mobile terminal disclosed in this patent document 1. Specifically, when customer information is transmitted from the customer's mobile terminal to a mobile carrier server, the mobile carrier server requests a credit card payment server to transmit credit card information, based on the customer information received from the mobile terminal.

Further, the mobile carrier server transmits the credit card information received from the credit card payment server to the mobile terminal. The mobile terminal then selectably displays the received credit card information, followed by encrypting the selected credit card information and displaying the encrypted information as a QR code (registered trademark) that is a two-dimensional code. A store terminal reads the QR code (registered trademark) displayed on the mobile terminal, for transmission to the credit card payment server together with sales information. The credit card payment server transmits credit card use information to the mobile terminal via the mobile carrier server, and transmits payment completion information to the store terminal.

In this way, payment is performed by causing the store terminal to read the credit card information from the QR code (registered trademark) displayed on the screen of the mobile terminal carried by the customer. This method of payment can prevent fraudulent use, theft, or loss of the credit card that would occur when the credit card is carried by the customer.

PRIOR ART REFERENCE

Patent Document

[Patent document 1] JP 2012-083913 A.

The configuration disclosed by the patent document 1 does not expect a third party's fraudulent use of an image of the information code displayed on a mobile terminal. For example, an image of the information code displayed on an information terminal could be captured by a different terminal for fraudulent purposes, in a system that carries out payment by causing a payment reader to optically read the information code displayed on the information terminal. In other words, fraudulent activities could take place, using the image of the information code captured with a fraudulent purpose. Not being limited to the payment process as described above, such a disadvantage can also be caused in a system, for example, which is used for entry/exit management performed by causing a reader at an entrance gate to optically read an information code that serves as an entry ticket. Specifically, when an image of an information code displayed on an information terminal is captured by a different terminal for a fraudulent purpose, fraudulent activities could take place, using the image of the information code captured for the fraudulent purpose.

SUMMARY

In light of the disadvantages set forth above, it is desired to further improve security in reading an information code, in a system including an information terminal for displaying an information code, and a reader for optically reading the information code.

To achieve the improvement set forth above, a typical example provides a system for reading an information code, including an information terminal displaying an information code, and a reader optically reading the information code. In the system, the reader includes a reader-side imaging unit capturing an image of the information code, an emission unit emitting light in a predetermined emission state when the reader-side imaging unit captures an image of the information code, and a decoding unit decoding the information code whose image has been captured by the reader-side imaging unit. In the system, the information terminal includes a display unit displaying the information code, a terminal-side imaging unit capable of capturing an image of an emission state of the emission unit of the reader, and a display control unit controlling a display state of the display unit. Further, in the system, the display control unit controls the display unit to display the information code, when an image of the predetermined emission state is captured by the terminal-side imaging unit.

In the typical example, the emission unit of the reader emits light in a predetermined emission state when an image of the information code is captured by the reader-side imaging unit. Also, the display control unit of the information terminal controls the display unit to display the information code, when an image of the predetermined emission state is captured by the terminal-side imaging unit.

Thus, in the information terminal, the display unit displays the information code only when an image of the predetermined emission state of the emission unit of the reader is captured by the terminal-side imaging unit. That is, unless an image of the predetermined emission state of the emission unit is captured, the information code is not displayed on the display unit to keep secrecy of the information code. Therefore, an image of the information code cannot be fraudulently captured. In this way, security is further improved than even before.

As another preferred example, the predetermined emission state may include a time-variable emission state. With the time-variable emission state being included in the predetermined emission state, a more complicated predetermined emission state can be created to serve as a key for displaying the information code. Thus, security is further improved in reading the information code.

As still another preferred example, the display control unit displays information indicating a code display region where the information code is displayed, prior to the terminal-side imaging unit capturing an image of the predetermined emission state of the emission unit, and controls the display unit to display the information code on the basis of the code display region, when an image of the predetermined emission state is captured.

Thus, seeing the information indicating the code display region, the user only has to hold the terminal-side imaging unit over the reader-side imaging unit such that the code display region recognized from the information is directed toward the reader-side imaging unit, so that an image is captured by the reader-side imaging unit. In this way, the display unit can be easily and positionally appropriately held over the reader-side imaging unit, prior to display of the information code.

In still another preferred example, the emission unit of a reader emits light in a specific emission state when an image of the information code is captured by the reader-side imaging unit, the specific emission state being renewed as occasion arises to enable specification of light-emitting time, and the decoding unit decodes the information code on the basis of the specific emission state which has been imaged by the reader-side imaging unit. Further, the display control unit of the information terminal controls the display unit to display the information code according to the specific emission state, when an image of the specific emission state is captured by the terminal-side imaging unit, the information code being generated by the information code production unit.

Thus, the information code displayed on the display unit of the information terminal is generated based on the emission state which can specify the time of image capture. Accordingly, the reader can easily determine whether the imaged information code has been generated at a time appropriate for using the present system. Thus, if the image of the information code displayed on the information terminal has been fraudulently captured, the information code read by the reader can be recognized as a fraudulent information code at a later date. In this way, security is further improved in reading the information code.

In a still another preferred example, the display control unit displays information indicating a code display region where the information code is displayed, prior to the terminal-side imaging unit capturing an image of the specific emission state of the emission unit, and controls the display unit to display the information code on the basis of the code display region, when an image of the specific emission state is captured.

Thus, seeing the information indicating the code display region, the user only has to hold the terminal-side imaging unit over the reader-side imaging unit such that the code display region recognized from the information is directed toward the reader-side imaging unit, so that an image is captured by the reader-side imaging unit. In this way, the display unit can be more easily and positionally appropriately held over the reader-side imaging unit, prior to display of the information code.

In still another preferred example, information indicating the code display region is part of the information code. Thus, the user can more intuitively recognize the code display region and can more easily hold the display unit over the reader-side imaging unit, prior to display of the information code with the addition of the rest of the information.

In still another preferred example, the emission unit is arranged so as to emit light in a direction in which an image is captured by the reader-side imaging unit, and the terminal-side imaging unit is arranged so as to capture an image in a direction to which a display surface of the display unit is oriented.

Thus, the emission unit should more easily fall within the imaging range of the terminal-side imaging unit and thus an image of the emission state of the emission unit can be easily captured. Accordingly, when the information terminal is held over the reader such that the display surface of the display unit is directed towards the reader-side imaging unit, an image of the emission state of the emission unit is captured to thereby display the information code on the display unit, and an image of the displayed information code is captured by the reader-side imaging unit. This configuration simplifies the operation of the information terminal for causing the reader to read the secret information code. In this way, security is even more improved and convenience is increased as well in reading an information code.

BRIEF DESCRIPTION OF THE DRAWINGS

In the accompanying drawings:

FIG. 4 is a flow diagram illustrating a flow of an information code displaying process performed by the information terminal, according to the first embodiment;

FIG. 7 is a schematic diagram illustrating processes performed by a reader, an information terminal, and an information code generation server, and illustrating a time-series relationship therebetween, according to the second embodiment;

FIG. 8 is a flow diagram illustrating a flow of an information code displaying process performed by the information terminal, according to the second embodiment;

DETAILED DESCRIPTION OF THE PREFERRED EMBODIMENTS

With reference to the accompanying drawings, hereinafter will be described various embodiments of a system for reading an information code according to the present disclosure.

First Embodiment

Referring to FIGS. 1 to 4 and FIGS. 5A and 5B, a first embodiment of a system for reading an information code (hereinafter referred to as information code reading system) will be described.

In an information code reading system 10 according to the present embodiment, an information code, such as a two-dimensional code, is displayed on an information terminal and the displayed information code is optically read by a reader, so that the reader can perform a process according to the information code.

Figure 1:
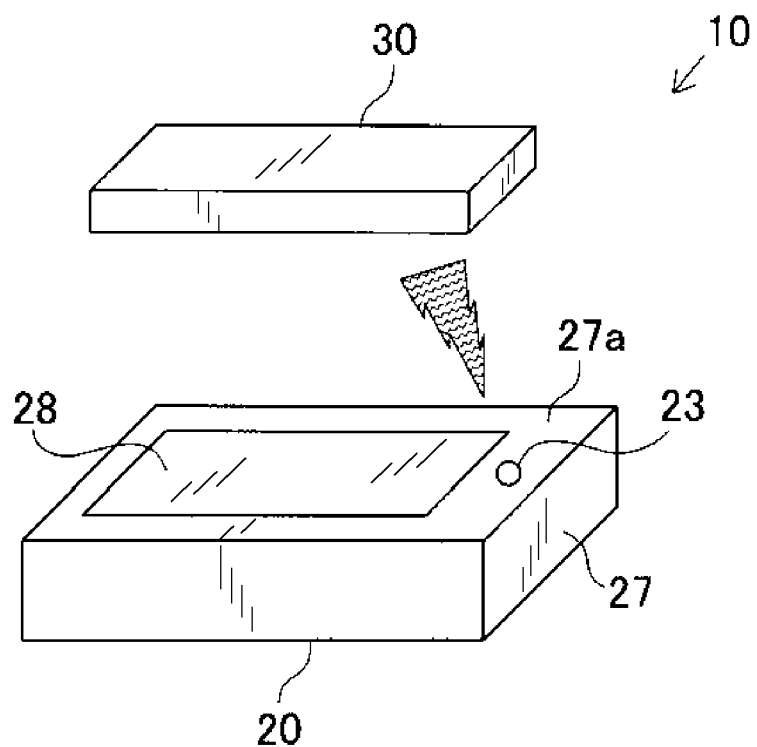
FIG. 1 is a schematic diagram illustrating an information code reading system, according to a first embodiment of the present disclosure.

The present embodiment is described by way of an example of an information code reading system which reads an information code to cause a reader thereof to perform a process associated with entry/exit management. The system is provided with a reader 20 disposed at an entrance gate, and an information terminal 30 capable of displaying an information code on a screen thereof. FIG. 1 illustrates the reader 20 as a stationary-type device, however, the reader 20 is not limited to stationary-type type but may, for example, be integrated into the entrance gate.

Figure 2:
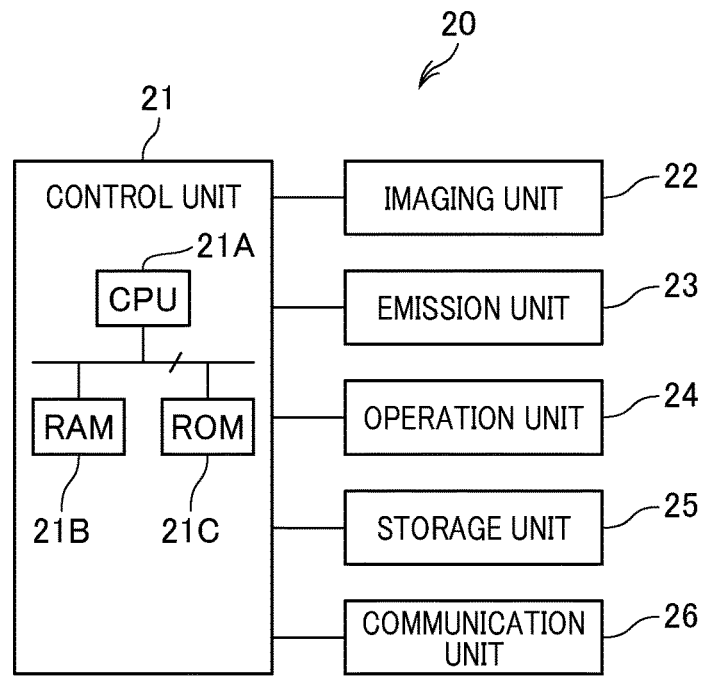
FIG. 2 is a block diagram illustrating an electrical configuration of a reader illustrated in FIG. 1.

First, referring to FIGS. 2 and 4, a configuration of the reader 20 will be described.

The reader 20 is configured as a stationary-type information code reader and disposed at an entrance gate to optically read an information code of the information terminal 30 held over the reader 20 to thereby acquire information on the visitor. As shown in FIG. 2, the reader 20 includes a control unit 21, an imaging unit 22, a light emission unit 23, an operation unit 24, a storage unit 25, and a communication unit 26. The control unit 21 is configured as a computer that includes a CPU (central processing unit) 21A, a RAM (random access memory) 21B as a volatile memory, and a ROM (read only memory) 21C as a nonvolatile memory. The imaging unit 22 is configured as a camera that includes a light-receiving sensor (e.g., C-MOS area sensor, CCD area sensor, etc.). The light emission unit 23 (hereinafter simply referred to as emission unit 23) is made up of LEDs or the like. The operation unit 24 is made up of various operation keys (not shown). The storage unit 25 includes storage media, such as ROM and RAM, not shown. The communication unit 26 is configured as a communication interface enabling wired or wireless communication with an external device, such as an entry management server (not shown), for managing entry.

As shown in FIG. 1, the reader 20 is provided with a casing 27 forming a shell of the reader 20. The casing 27 has an upper surface 27a provided with a reading port 28 over which an information code or the like is held. The imaging unit 22 is disposed inside the casing 27 to receive light reflected such as from the information code held over the reading port 28 to thereby serve as the reader-side imaging unit for capturing an image.

The emission unit 23 is disposed on the upper surface 27a of the casing 27 so as to be positioned near the reading port 28. Thus, the emission unit 23 is disposed such that light is ensured to be emitted in the direction in which an image is captured by the imaging unit 22. The emission unit 23 is controlled by the control unit 21 to emit light in a predetermined light-emitting state (hereinafter, the light-emitting state is simply referred to as emission state) when reading an information code, as will be described later. The predetermined emission state in the present embodiment corresponds to a time-variable emission state, e.g. an emission state in which light with a given color flashes every 1 second.

In the configuration described above, an application program associated with a reading process for optically reading an information code is stored in advance in the ROM 21C of the control unit 21 (or the ROM of the storage unit 25) so as to be executed by the CPU 21A of the control unit 21. When the application program is executed, the processing associated with the entry management is performed, making use of the optically read information code. The CPU 21A uses the RAM 21B as a temporary memory or the like of information.

Figure 3:
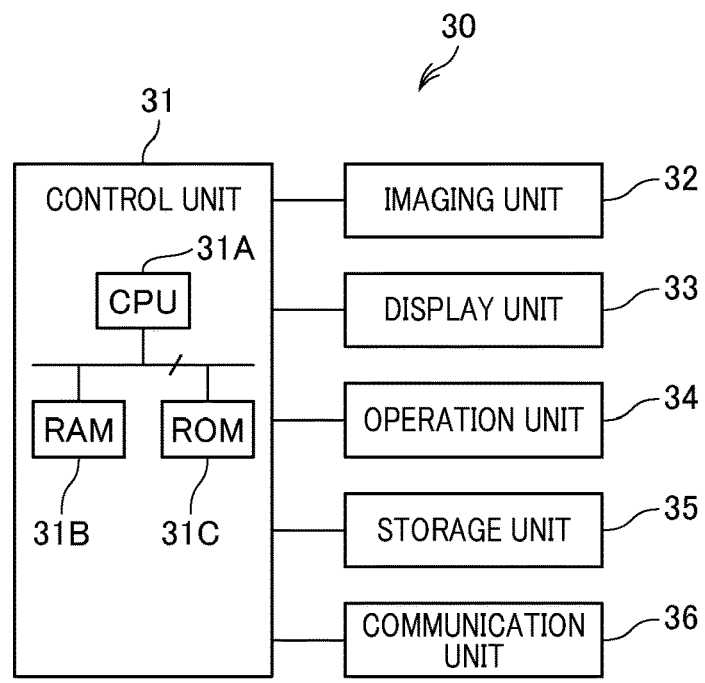
FIG. 3 is a block diagram illustrating an electrical configuration of an information terminal illustrated in FIG. 1.

Referring now to FIG. 3, a configuration of the information terminal 30 will be described.

The information terminal 30 corresponds to a mobile terminal carried by a visitor (user), and is configured as a terminal, e.g., a smartphone, having a display screen. As shown in FIG. 3, the information terminal 30 includes a control unit 31, an imaging unit 32, a display unit 33, an operation unit 34, a storage unit 35, and a communication unit 36. The control unit 31 is configured as a computer that includes a CPU (central processing unit) 31A, a RAM (random access memory) 31CB as a volatile memory, and a ROM 31C as a nonvolatile memory. The imaging unit 32 is configured as a camera that includes a light-receiving sensor (e.g., C-MOS area sensor, CCD area sensor, etc.). The display unit 33, such as a liquid crystal device, includes a display surface (screen) and an element for driving the display surface. The operation unit 34 is made up of various operation keys, a touch panel and the like (not shown). The storage unit 35 includes storage media, such as ROM, RAM and the like, not shown. The communication unit 36 is configured as a communication interface enabling wired or wireless communication with the reader 20 or the like directly or by using a predetermined communication network or the like, such as a telecommunications network.

Figure 5A:
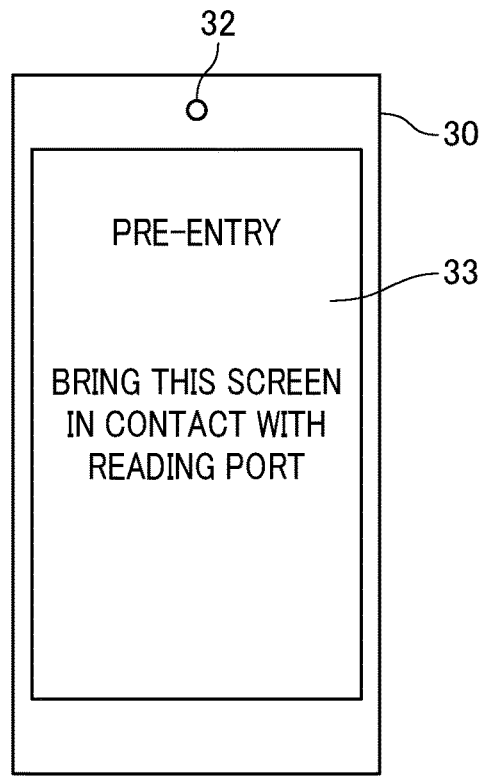
FIG. 5A is a diagram illustrating a screen of the information terminal in a state of displaying information prompting the user to hold the information terminal over a reading port, with the display surface being directed toward the reading port, according to the first embodiment.
Figure 5B:
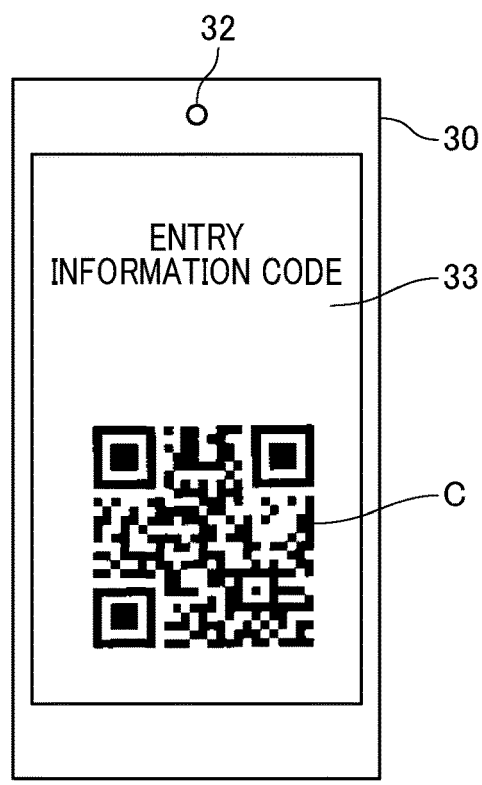
FIG. 5B is a diagram illustrating the screen of the information terminal in a state of displaying an information code, according to the first embodiment.

The imaging unit 32 serves as a terminal-side imaging unit enabling capture of a still or video image, and is disposed near the display surface (screen) of the display unit 33 (see FIGS. 5A and 5B). Thus, the imaging unit 32 is disposed so as to capture an image in a direction toward which the display surface of the display unit 33 is directed.

The display unit 33 is controlled by the control unit 31 to serve as the displaying means for displaying an information code C, textual information, or the like described later. The control unit 31 serves as a display control unit for controlling the display state of the display surface of the display unit 33.

The ROM 31A of the control unit 31 (or the ROM of the storage unit 35) stores information associated with an information code, and 30 also stores in advance an application program associated with an information code displaying process, described later, so as to be executed by the CPU 31A. When the application program is executed by the control unit 31 (i.e. CPU 31A), the information code displaying process is performed to display the information code stored in the ROM 31C (or the ROM of the storage unit 35) at a predetermined time point on the display surface of the display unit 33. With the application program being installed, the information associated with a predetermined state is stored in the storage unit 35. The predetermined emission state is used as a reference based on which it is determined whether the emission state in an image captured by the imaging unit 32 is in the predetermined emission state mentioned above. The CPU 31A uses the RAM 31B as a temporary memory or the like of information.

The ROMs 21C and 31C (or the ROMs of the storage units 25 and 35) each serve as a non-transitory computer readable medium.

In the system of the present embodiment, the reader 20 that has read an information code performs a process associated with entry management. Therefore, the information code C corresponding to an entry ticket is bought by the user beforehand from the operating company selling and managing entry tickets, and stored in advance in the storage unit 35 so as to be available in the information code displaying process. The information code C is generated to record information, such as a serial number, associated with the entry management (hereinafter may also simply referred to as entry ticket information).

Referring to the flow diagram shown in FIG. 4, the information code displaying process will be specifically described. The information code displaying process is cyclically performed by the control unit 31 (CPU 31A) of the information terminal 30 when the user carrying the information terminal 30 passes through the entrance gate where the reader 20 is set up. In the reader 20, the emission unit 23 is currently activated in the predetermined emission state mentioned above, while the control unit 21 is performing a reading process for optically reading the information code C held above the reading port 28. In the present embodiment and other embodiments described later, the information code C corresponding to an entry ticket is configured in the form of a QR code (registered trademark) that is a two-dimensional code. However, the information code C is not limited to such a QR code (registered trademark), but may be configured as a different type information code, such as a barcode, a data matrix code, a maxi code, or the like.

When the user carrying the information terminal 30 passes through the entrance gate where the reader 20 is set up, a predetermined operation is performed with respect to the operation unit 34, so that the control unit 31 (CPU 31A) can start the information code displaying process. First, in step S101 shown in FIG. 4, a pre-entry information displaying process is performed. Specifically, as shown in FIG. 5A, the display unit 33 displays information reading, for example, "Bring the screen in contact with the reading port". With this information, the user is prompted to hold the display surface of the display unit 33 over the imaging unit 22 of the reader 20 so that an image of the display surface can be captured.

Then, an imaging process shown in step S103 is performed so that the imaging unit 32 can capture a video image. Then, in a determination process shown in step S105, it is determined whether the imaging unit 32 has captured an image of the predetermined emission state of the emission unit 23 of the reader 20, based on the information on the determiner emission state stored in the storage unit 35 in advance. If the image of the predetermined emission state has not been captured by the emission unit 23 because the display surface of the display unit 33 is not held over the reading port 28 (No in step S105), the imaging process is performed to keep the state where the imaging unit 32 can capture a video image.

With the image capturing state being kept, when the display surface of the display unit 33 is held over the reading port 28 by the user, the emission unit 23 should fall within the imaging range of the imaging unit 32, so that the imaging unit 32 can capture the image of the predetermined emission state of the emission unit 23. Thus, based on the information on the predetermined emission state stored in the storage unit 35, the control unit 31 determines that the predetermined emission state of the emission unit 23 of the reader 20 has been imaged, thereby making a Yes determination 5 in step S105. In this case, as shown in FIG. 5B, the information code C stored in advance in the storage unit 35 is displayed on the display surface of the display unit 33 (S107).

In the reader 20, the imaging unit 22 captures an image of the information code C via the reading port 28 over which the display surface of the display unit 33 displaying the information code C is held. Thus, the control unit 21 carries out a known decoding process to decode the information code C and acquire the entry ticket information. The entry ticket information acquired in this way is transmitted to the entry management server by the communication unit 26. The entry management server performs an entry management process using the received entry ticket information, including, for example, a process of determining whether the entry ticket information is valid, and a process of transmitting the results of the determination to the entrance gate. The entrance gate uses, as a basis, the results of the determination received from the entry management server to perform a notifying process, regarding the validity of the entry ticket information. The notifying process includes, for example, a light-emitting or sounding process of indicating that the entry ticket information is valid or invalid, so that the staff person at the entrance gate is notified of the results of the determination.

As described above, the information code reading system 10 of the present embodiment causes the emission unit 23 of the reader 20 to emit light in a predetermined emission state when the imaging unit 22 captures an image of the information code C. When an image of the predetermined emission state is captured by the imaging unit 32, the control unit 31 of the information terminal 30 drives/controls the display unit 33 to display the information code C.

Thus, the information terminal 30 displays the information code C on the display surface of the display unit 33 only when the predetermined emission state of the emission unit 23 of the reader 20 has been imaged by the imaging unit 32. In other words, unless the predetermined emission state of the emission unit 23 is imaged, the information code C is kept secret without being displayed on the display surface of the display unit 33. Accordingly, the information code C is prevented from being fraudulently imaged, which leads to the improvement of security in reading the information code C.

In the above predetermined emission state, light is flashed every 1 second. With such a time-variable emission state being included in the predetermined emission state, a more complicated predetermined emission state can be created to serve as a key for displaying the information code C. Accordingly, security is further improved in reading the information code C. The predetermined emission state is not limited to the state where light is flashed every 1 second. For example, a different time-variable emission state may be used, including, for example, an emission state where two or more different colors of light are sequentially flashed.

The emission unit 23 is arranged near the reading port 28 to emit light in a direction in which an image is captured by the imaging unit 22. Further, the imaging unit 32 is arranged near the display surface of the display unit 33 to capture an image in a direction toward which the display surface of the display unit 33 is directed.

Thus, in a state where the display surface of the display unit 33 is directed toward the imaging unit 22 via the reading port 28, the emission unit 23 should easily fall in the imaging range of the imaging unit 32 to facilitate image capture of the emission state of the emission unit 23. Thus, when the information terminal 30 is held over the reader 20 such that the display surface of the display unit 33 is directed toward the imaging unit 22, an image of emission state of the emission unit 23 is captured, followed by displaying the information code C on the display surface of the display unit 33. Then, an image of the displayed information code C is captured by the imaging unit 22. This configuration can simplify the operation of the information terminal 30 for allowing the reader 20 to read the secret information code C. In this way, security is improved and convenience is increased in reading the information code C.

The arrangement of the emission unit 23 is not limited to the vicinity of the reading port 28 to emit light in a direction in which an image is captured by the imaging unit 22. For example, the emission unit 23 may be provided on a side surface of the casing 27 to emit light in a direction in which an image is captured by the imaging unit 22. Also, the arrangement of the imaging unit 32 is not limited to the vicinity of the display surface of the display unit 33 to capture an image in a direction to which the display surface of the display unit 33 is oriented. The imaging unit 32 may be arranged on a side surface of the casing forming the shell of the information terminal 30 (the surface continuing from the front surface, including the display surface, of the display unit 33) to capture an image in a direction to which the display surface of the display unit 33 is oriented.

To further improve security, the information code C displayed on the display surface of the display unit 33 of the information terminal 30 may be configured to have encrypted information recorded therein. For example, the information code C may be configured as a partially non-public code including a non-public region where information encrypted by a predetermined encryption key is recorded, and a public region where information not encrypted by the encryption key is recorded. In this case, the information can be decoded only by a reader 20 having a decoding key corresponding to the encryption key. It should be noted that the public region of a partially non-public code is configured to be read by a normal reader having no decoding key. Favorably used methods of generating such a partially non-public code and specific configurations of such a partially non-public code can be found, for example, in the techniques disclosed in JP 2009-009547 A and JP 2008-299422 A.

Second Embodiment

Referring now to FIGS. 6 to 9, an information code reading system according to a second embodiment of the present disclosure will be described.

The information code reading system of the second embodiment is different from that of the first embodiment in that a payment process is performed using an information code. In the present embodiment, the components substantially the same as those in the information code reading system of the first embodiment are given the same reference numerals for the sake of omitting or simplifying description.

Figure 6:
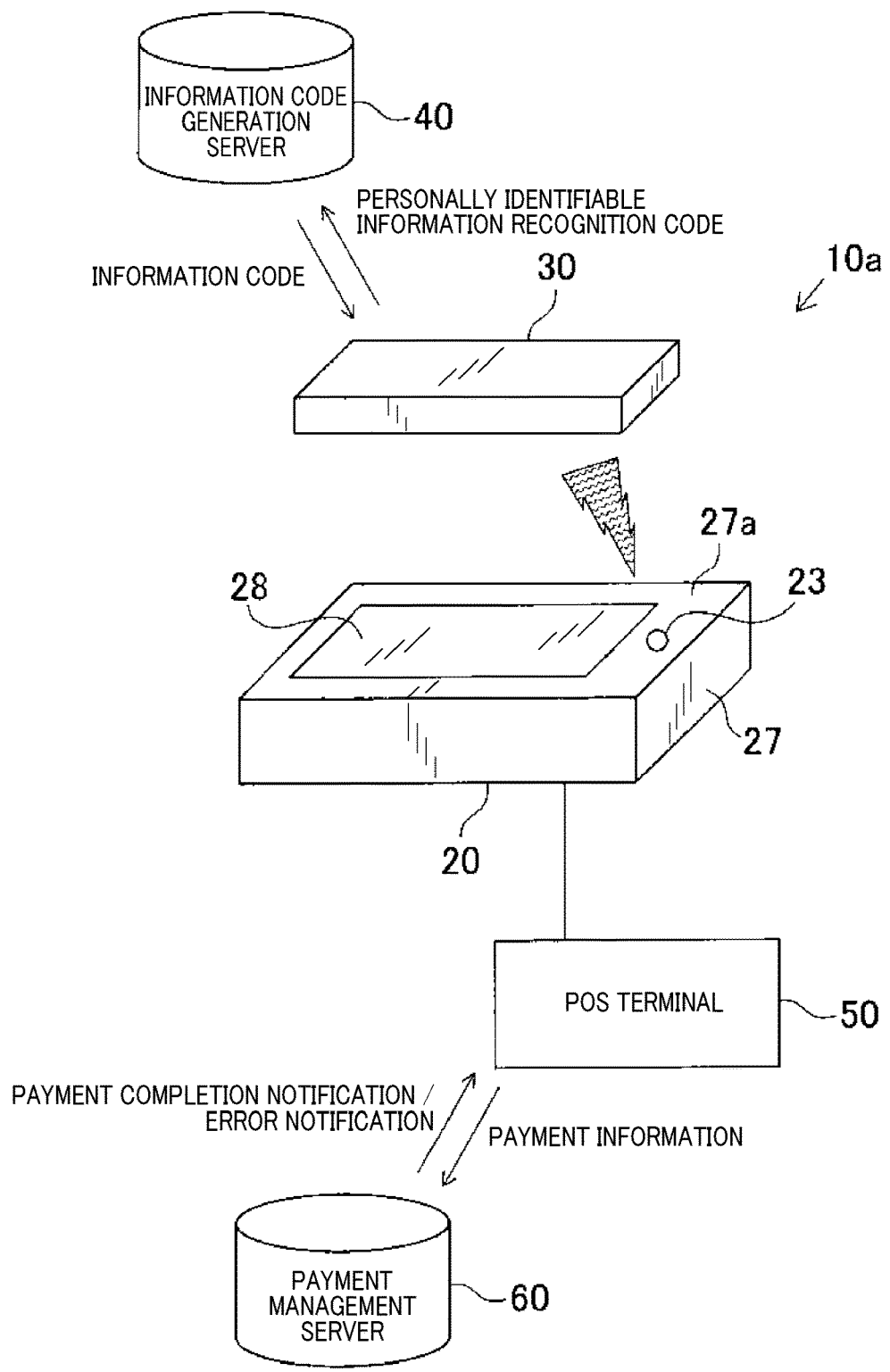
FIG. 6 is a schematic diagram illustrating a configuration of an information code reading system, according to a second embodiment of the present disclosure.

As shown in FIG. 6, an information code reading system 10a of the present embodiment includes an information code generation server 40, besides the reader 20 serving as a payment device and the information terminal 30 carried by a payment user. The information code generation server 40 serves as an information code generating unit that generates an information code C, on the basis of the information received from the information terminal 30, while serving as a transmitter that transmits the information on the generated information code C to the information terminal 30.

In the present embodiment, the reader 20 is arranged on a desk or the like of a store to serve as a transmitter that transmits the results of reading the information code C at the time of the payment user purchasing an article, to a POS (point-of-sale) terminal 50 used for payment. To further improve security in reading the information code C in the present embodiment, the control unit 21 controls the emission unit 23 such that the emission unit 23 emits light in a specific emission state which is renewed as occasion arises to enable specification of the light-emitting time. For example, the emission unit 23 flashes in red every 1 second in some period of time, and flashes in blue at alternate interval of 0.5 seconds and 2 seconds in another period of time. Thus, an emission state of the emission unit 23 in some period of time is made different from the emission state of the emission unit 23 in another period of time. Accordingly, the light-emitting time can be specified from the video image capturing the emission state. In other words, the specific emission state can be used as an authentication code (identifying signal) which is uniquely generated by the reader 20 in a one-time manner. For example, in the present embodiment, an authentication code can be generated based on an emission color and a flash interval (emission pattern).

After capturing an image of the specific emission state of the emission unit 23, the information terminal 30 generates an authentication code which is unambiguously derived from the specific emission state, and then transmits the authentication code to the information code generation server 40, together with the information which is stored in the storage unit 35 in advance and which can specify the user (hereinafter may also referred to as personally identifiable information). In response to the transmission, the information terminal 30 receives information on the information code C for payment use, from the information code generation server 40.

Figure 9A:
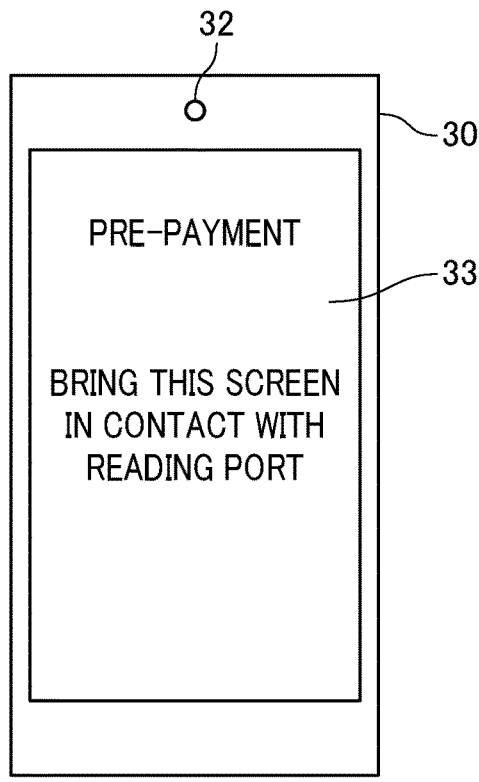
FIG. 9A is a diagram illustrating a screen of the information terminal in a state of displaying information prompting the user to hold the information terminal over a reading port, with the display surface being directed toward the reading port, according to the second embodiment.

Referring to FIGS. 7 to 9, hereinafter will be specifically described an information code displaying process performed by the control unit 31 of the information terminal 30 in performing payment using the information code C displayed on the information terminal 30, and processes performed by the reader 20 and the information code generation server 40.

In the reader 20 arranged near the POS terminal 50, the emission unit 23 is brought into a specific emission state and the imaging unit 22 is brought into a state where an image can be captured via the reading port 28, in response to an instruction from the POS terminal 50 or the operation of the operation unit 24 (see F1 of FIG. 7).

In performing payment using the information code C in a store or the like, the user carrying the information terminal 30 performs a predetermined operation for the operation unit 34. In response to the predetermined operation, the control unit 31 starts the information code displaying process. First, the control unit 31 performs a pre-payment information displaying process shown in step S201 of FIG. 8. Specifically, the control unit 31 displays information reading "Bring the screen in contact with the reading port" or the like on the display surface of the display unit 33. Thus, the user is prompted to hold the display surface of the display unit 33 over the reading port 28 so that the imaging unit 22 of the reader 20 can capture an image (see F2 of FIG. 7).

Then, an imaging process shown in step S203 is performed to bring the imaging unit 32 into a state of capturing a video image (see F3 of FIG. 7). Then, a determination process shown in step S205 is performed to determine whether an image of the specific emission state of the emission unit 23 of the reader 20 has been captured by the imaging unit 32. If an image of the specific emission state of the emission unit 23 has not been captured because the display surface of the display unit 33 is not held over the reading port 28 (No in step S205), the imaging process is performed to keep the state where the imaging unit 32 can capture a video image.

With the image capturing state being kept, when the display surface of the display unit 33 is held over the reading port 28 by the user, the emission unit 23 should fall within the imaging range of the imaging unit 32, thereby enabling the imaging unit 32 to capture the specific emission state of the emission unit 23. Thus, after a Yes determination has been made in step S205, control proceeds to step S207 where an authentication code reception process is performed. In the authentication code reception process, the control unit 31 receives the imaged specific emission state, or specifically, receives an authentication code that has been generated based on the emission color and the flash interval of the emission unit 23 (see F4 of FIG. 7). Then, the control unit 31 performs a personally identifiable information and authentication code transmission process shown in step S209 to transmit the authentication code received as described above to the information code generation server 40, together with the personally identifiable information stored in advance in the storage unit 35 (see F5 of FIG. 7).

Upon reception of the authentication code and the personally identifiable information transmitted in this way, the information code generation server 40 encrypts the received personally identifiable information using the received authentication code to thereby generate an information code C (see F6 of FIG. 7). Accordingly, since the authentication code used for encryption is indispensable for decoding the information code C, a reader not provided with the corresponding authentication code is not able to decode the information code C. The information on the information code C generated in this way is transmitted to the information terminal 30 that has transmitted the authentication code and the personally identifiable information (see F7 of FIG. 7).

Figure 9B:
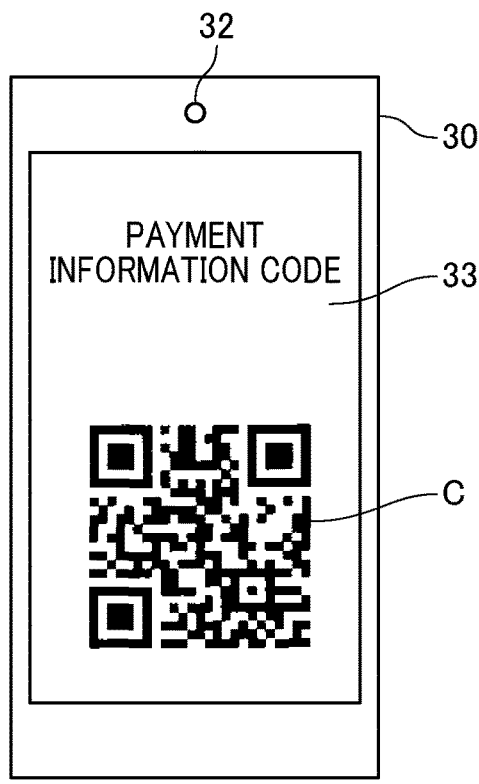
FIG. 9B is a diagram illustrating the screen of the information terminal in a state of displaying an information code, according to the second embodiment.

The information terminal 30 that has transmitted the authentication code and the personally identifiable information receives the information on the information code C that has been transmitted as described above from the information code generation server 40 (Yes in step S211). Then, control proceeds to step S213 where an information code displaying process is performed. As shown in FIG. 9B, in the information code displaying process, the received information code C is displayed on the display surface of the display unit 33 in a state of being held over the reading port 28 (see F8 of FIG. 7).

Since the display surface of the display unit 33 displaying the information code C is held over the reading port 28 as mentioned above, the imaging unit 22 captures an image of the information code C via the reading port 28 (see F9 of FIG. 7). Further, since the authentication code corresponding to the present specific emission state of the emission unit 23 is available in the reader 20, the control unit 21 performs a predetermined decoding process using the authentication code to decode the information code C, thereby acquiring the personally identifiable information (see F10 of FIG. 7). If the decoding process using the authentication code corresponding to the present specific emission state is unsuccessful, the decoding process may be performed using the authentication code such as of the previous time or one before the previous time corresponding to the specific emission state, considering the time lag or the like of the emission state. The control unit 21 that decodes the information code C using an authentication code can correspond to an example of the decoding unit.

The personally identifiable information acquired in this way is transmitted to the POS terminal 50 by the communication unit 26. The POS terminal 50 transmits the personally identifiable information received from the reader 20 to a payment management server 60 for performing a payment related process, together with payment information including a payment amount and the like that has been inputted in response to the operation of the POS terminal 50 at the time of payment. The payment management server 60 determines whether a payment process can be completed, based on the personally identifiable information, the payment amount, and the like received from the POS terminal 50. If it is determined that a payment process can be completed, the payment management server 60 performs a payment process suitable for the payment amount and the like and then transmits a payment completion notification to the POS terminal 50. On the other hand, if it is determined that a payment process cannot be completed due to insufficient available amount of money or the like, an error notification is transmitted to the POS terminal 50.

As described above, in the information code reading system 10a of the present embodiment, the emission unit 23 of the reader 20 emits light in a specific emission state when the imaging unit 22 captures an image of the information code C, the specific emission state being renewed as occasion arises to enable specification of the light-emitting time, while the control unit 21 decodes the information code C which has been imaged by the imaging unit 22, on the basis of the specific emission state. When the imaging unit 32 captures an image of the specific emission state, the control unit 31 of the information terminal 30 drives/controls the display unit 33 to display the information code C generated by the information code generation server 40 according to the specific emission state.

Thus, the information code C displayed on the display surface of the display unit 33 of the information terminal 30 is generated based on the emission state that can specify the time of image capture. Accordingly, the reader 20 can easily determine whether the imaged information code C has been generated at an appropriate time for using the present system. Thus, if the image of the information code displayed on the information terminal 30 has been fraudulently captured, the information code C read by the reader 20 can be recognized as a fraudulent information code at a later date. In this way, security is improved in reading the information code C.

The information code C is not limited to be generated by the information code generation server 40 but may be generated in the information code generation process performed by the control unit 31 of the information terminal 30. In this case, the control unit 31 can correspond to an example of the information code generation unit.

Third Embodiment

Referring to FIG. 10, an information code reading system according to a third embodiment of the present disclosure will be described.

The information code reading system of the third embodiment is different from that of the first embodiment in that the display screen before displaying an information code has been changed. In the present embodiment, the components substantially the same as those in the information code reading system of the first embodiment are given the same reference numerals for the sake of omitting or simplifying description.

As shown in FIG. 5A referred to in the description provided above, the display screen merely displaying textual information does not imply the position where the information code is displayed. Therefore, an appropriate portion of the display surface (screen) of the display unit 22 is not necessarily held over the reading port 28 of the reader 20.

Figure 10A:
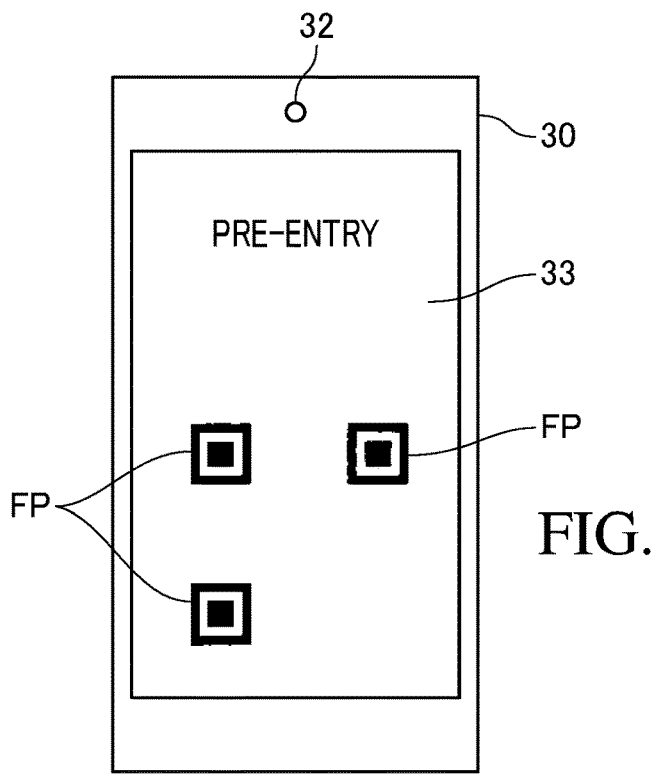
FIGS. 10A and 10B are diagrams each illustrating a screen of an information terminal of an information code reading system, the screen being in a state of displaying one of various pieces of information provided by the system, according to a third embodiment of the present disclosure.

To cope with this disadvantage, the control unit 31 of the present embodiment displays information on a code region where the information code is displayed, before the imaging unit 32 captures an image of the predetermined emission state of the emission unit 23. For example, as shown in FIG. 10A, the control unit 31 displays three finder patterns FP (also referred to as position detection regions) on the display surface (screen) of the display unit 33, as information for indicating a code display region where the information code is displayed. The three finder patterns FP specify the position of a QR code (registered trademark). When an image of the predetermined emission state of the emission unit 23 is captured by the imaging unit 32, the control unit 31 drives/controls the display unit 33 to display the information code C, based on the three finder patterns FP (code display regions) (see FIG. 5B).

Thus, seeing the three finder patterns FP (information indicating a code display region), the user only has to hold the information terminal over the reading port such that the code display region recognized from the information is directed toward the imaging unit 22, so that the imaging unit 22 can capture an image. In this way, the display surface of the display unit 33 can be easily and positionally appropriately held over the imaging unit 22, prior to display of the information code C.

The information indicating the code display region is not limited to the three finder patterns FP, but may be a different fixed pattern configuring part of a QR code (registered trademark). If a different type information code is used, a fixed pattern or the like configuring part of the different type information code may be displayed on the display surface of the display unit 33, as information indicating a code display region.

Figure 10B:
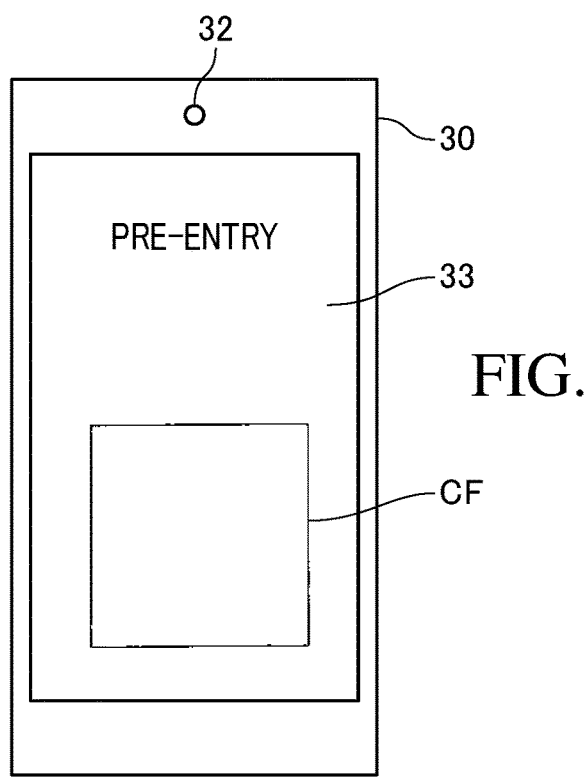

As in a modification shown in FIG. 10B, the information indicating the code display region may be displayed in the form of a frame CF indicating the perimeter of the code display region.

The configuration for displaying the information on a code display region prior to image capture of an emission state of the emission unit 23 is characteristic of the present embodiment. This characteristic configuration can be applied to other embodiments.

Other Embodiments

The present disclosure is not limited to the foregoing embodiments and modifications, but may be variously changed as set forth below, for example, within a range not departing from the spirit of the present disclosure.

Specifically, the predetermined emission state or the specific emission state described above is not limited to be realized by one emission unit 23, but may be realized by a plurality of emission units 23. Further, the predetermined emission state or the specific emission state described above is not limited to include a time-variable emission state, but may be realized in the form of a static emission state, including an emission state, for example, where a plurality of emission units maintain an emission state of simply individually and simultaneously emitting light of respective specific wavelength bands. In this case, whether a predetermined emission state or a specific emission state has been imaged can be determined based on the still image captured by the imaging unit 32.

The present disclosure is not limited to the usage in an information code reading system for performing entry management or payment by causing the reader 20 to read the information code C displayed on the screen of the information terminal 30. The present disclosure may be applied, for example, to an information code reading system in which an information terminal is used as a membership card and authentication is performed by using an information code displayed on the screen. In this case, the information code reading system performs a process (e.g., provision of services) which is based on the information acquired by causing a reader to read an information code displayed on the screen of an information terminal to decode the information code. With this system as well, the information code C can be kept secret without being displayed on the display surface of the display unit 33, unless an image of the predetermined emission state of the emission unit 23 is captured. Accordingly, the information code C cannot be fraudulently imaged, thereby improving security in reading the information code C.

EXPLANATION OF REFERENCE NUMBERS 10, 10a information code reading system (system for reading information code)
20 reader
21 control unit (serving as decoding unit)
22 imaging unit (serving as reader-side imaging unit)
23 emission unit
30 information terminal
31 control unit (serving as display control unit)
32 imaging unit (serving as terminals-side imaging unit)
33 display unit (including display surface (screen))
40 information code generation server (serving as information code generation unit)
C information code

What is claimed is:

1. A system for reading an information code, the system comprising an information terminal displaying an information code, and a reader optically reading the information code, wherein:
the reader comprises:
a reader-side imaging unit capturing an image of the information code;
an emission unit emitting light in a predetermined emission state when the reader-side imaging unit captures an image of the information code; and
a decoding unit decoding the information code whose image has been captured by the reader-side imaging unit, and
the information terminal comprises:
a display unit displaying the information code;
a terminal-side imaging unit capable of capturing an image of an emission state of the emission unit by receiving the light;
a storage unit capable of previously storing therein information that indicates the predetermined emission state of the emission unit in advance; and
a display control unit controlling a display state of the display unit,
wherein the display control unit is configured to determine whether or not the imaging unit captures an image of the predetermined emission state of the emission unit, based on the information stored in the storage unit, and control the display unit to display the information code when it is determined that the image of the predetermined emission state is captured by the terminal-side imaging unit.

2. The system according to claim 1, wherein the predetermined emission state includes a time-variable emission state.

3. The system according to claim 2, wherein the display control unit is configured to display information indicating a code display region where the information code is displayed, prior to the terminal-side imaging unit capturing the image of the predetermined emission state of the emission unit, and control the display unit to display the information code on the basis of the code display region, when an image of the predetermined emission state is captured.

4. The system according to claim 3, wherein information indicating the code display region is part of the information code.

5. The system according to claim 2, wherein:
the emission unit is arranged so as to emit light in a direction in which an image is captured by the reader-side imaging unit; and
the terminal-side imaging unit is arranged so as to capture an image in a direction toward which a display surface of the display unit is directed.

6. The system according to claim 1, wherein the display control unit is configured to display information indicating a code display region where the information code is displayed, prior to the terminal-side imaging unit capturing the image of the predetermined emission state of the emission unit, and control the display unit to display the information code on the basis of the code display region when the image of the predetermined emission state is captured.

7. The system according to claim 6, wherein information indicating the code display region is part of the information code.

8. The system according to claim 7, wherein:
the emission unit is arranged so as to emit light in a direction in which an image is captured by the reader-side imaging unit; and
the terminal-side imaging unit is arranged so as to capture an image in a direction toward which a display surface of the display unit is directed.

9. The system according to claim 1, wherein:
the emission unit is arranged so as to emit light in a direction in which an image is captured by the reader-side imaging unit; and
the terminal-side imaging unit is arranged so as to capture an image in a direction toward which a display surface of the display unit is directed.

10. The system according to claim 9, wherein:
the emission unit is arranged so as to emit light in a direction in which an image is captured by the reader-side imaging unit; and
the terminal-side imaging unit is arranged so as to capture an image in a direction toward which a display surface of the display unit is directed.

11. The system according to claim 1, wherein:
the information terminal comprises an operation unit, and
the display control unit is configured to enable the determination of whether or not the imaging unit captures the image of the predetermined emission state of the emission unit in response to a predetermined operation at the operation unit.

12. A system for reading an information code, the system comprising an information terminal displaying an information code, and a reader optically reading the information code, wherein:
the reader comprises:
a reader-side imaging unit capturing an image of the information code;
an emission unit emitting light in a predetermined emission state when an image of the information code is captured by the reader-side imaging unit, the predetermined emission state being renewed as occasion arises to enable specification of light-emitting time; and
a decoding unit decoding the information code on the basis of the predetermined emission state which has been imaged by the reader-side imaging unit, and
the information terminal comprises:
a display unit displaying the information code;
a terminal-side imaging unit capable of capturing an image of an emission state of the emission unit by receiving the light;
an information code generation unit generating the information code according to the predetermined emission state which has been imaged by the terminal-side imaging unit;
a storage unit capable of previously storing therein information that indicates the predetermined emission state of the emission unit in advance; and
a display control unit controlling a display state of the display unit,
wherein the display control unit is configured to determine whether or not the imaging unit captures an image of the predetermined emission state of the emission unit, based on the information stored in the storage unit, and control the display unit to display the information code when it is determined that the image of the predetermined emission state of the emission unit is captured by the terminal-side imaging unit, the information code being generated by the information code generation unit.

13. The system according to claim 12, wherein:
the information terminal comprises an operation unit, and
the display control unit is configured to enable the determination of whether or not the imaging unit captures the image of the predetermined emission state of the emission unit in response to a predetermined operation at the operation unit.

14. The system according to claim 12, wherein the display control unit is configured to display information indicating a code display region where the information code is displayed, prior to the terminal-side imaging unit capturing the image of the predetermined emission state of the emission unit, and control the display unit to display the information code on the basis of the code display region, when an image of the predetermined emission state is captured, the information code being generated by the information code generation unit.

15. The system according to claim 14, wherein:
the emission unit is arranged so as to emit light in a direction in which an image is captured by the reader-side imaging unit; and
the terminal-side imaging unit is arranged so as to capture an image in a direction toward which a display surface of the display unit is directed.

16. The system according to claim 14, wherein information indicating the code display region is part of the information code.

17. The system according to claim 16, wherein:
the emission unit is arranged so as to emit light in a direction in which an image is captured by the reader-side imaging unit; and
the terminal-side imaging unit is arranged so as to capture an image in a direction toward which a display surface of the display unit is directed.

* * * * *